Patented July 8, 1952

2,602,815

UNITED STATES PATENT OFFICE 2,602,815

SULFUR-CONTAINING POLYCARBOXYLIC ACIDS

James T. Gregory, Cuyahoga Falls, and Jacob E. Jansen, Akron, Ohio, assignors to The B. F. Goodrich Company, New York, N. Y., a corporation of New York No Drawing. Application June 18, 1947, Serial No. 755,476

7 Claims. (Cl. 260—535)

This invention relates to new compositions of matter and to a method for their preparation, and pertains more specifically to new sulfur-containing polycarboxylic acids, which are very useful organic compounds.

The new compounds of this invention possess the general formula

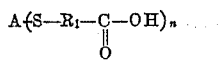

wherein $R_1$ is alkylene, A is a polyvalent aliphatic radical having its connecting valences on carbon atoms and containing only atoms of carbon, hydrogen and sulfur or oxygen (i. e., a chalcogen occurring in one of the short periods of the periodic table), the sulfur or oxygen being present in the divalent state and being connected by each of its two valences to two different carbon atoms, and $n$ is a number equal to the valence of A, preferably from 2 to 4.

The alkylene radical $R_1$ may be straight-chain or branched; it may have its two valences on the same or different carbon atoms and it may contain any desired number of carbon atoms, but preferably contains from 1 to 4 carbon atoms.

The radical A may be of any of the following types, in which R represents hydrocarbon radicals and X represents oxygen or sulfur:

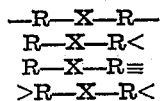

or it may be a radical containing several of these structures as, for example, —R—X—R—X—R—, or any other radical of the nature hereinabove described.

The preferred compounds of the above general class are dithiadicarboxylic acids which possess the formula:

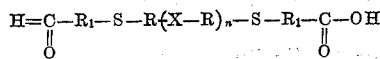

wherein R and $R_1$ are alkylene, X is a chalcogen occurring in one of the short periods of the periodic table, and $n$ is a number equal to the number of (X—R) groups present, preferably from 1 to 4.

These compounds may be prepared quite readily by reacting a polychloroether or thioether with a mercapto-acid in the presence of an alkali and then acidifying the reaction mixture. It is quite surprising that the reaction between polychloroethers or thioethers and mercapto-acids may be effected so readily, since organic chlorine-containing ethers show unusual stability, and ordinarily react with other materials very slowly or not at all.

The reaction of the polychloroether or thioether and the mercapto-acid proceeds substantially according to the following equation, when NaOH is used as the alkali and the reaction mixture is acidified with HCl:

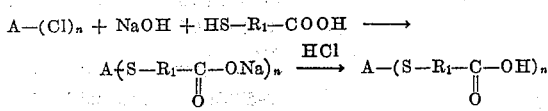

wherein $R_1$, A and $n$ have the meaning set forth hereinabove. Other alkali metal hydroxides may be used in place of NaOH and other mineral acids used in place of HCl if desired, as will be apparent to those skilled in the art.

The preferred polychloroethers and thioethers which are reacted with mercapto-acids to form the new compounds of this invention are those containing two or more chlorine atoms, each on a different carbon atom. Among the compounds of this class are included:

Dichloro ethers such as alpha, beta-dichlorodiethyl ether, alpha, alpha'-dichloro dimethyl ether, gamma, gamma'-dichloro-dipropyl ether, beta, beta'-dichloroisopropyl ether, beta, beta'-dichloro-diethylether, alpha, alpha'-dichloro-dibutyl ether, triglycol dichloride and other dichloro ethers of the formula Cl—R—(O—R)$_n$—Cl wherein $n$ is a number preferably from 1 to 4, and R is an alkylene radical preferably containing from 1 to 10 carbon atoms;

Dichloro thioethers such as beta, beta'-dichloro-diethyl sulfide, beta, beta'-dichloro-ethyl thio ethane, dichloro-methyl thio propane, dichloro-dimethyl sulfide, gamma, gamma'-dichloro-dipropyl sulfide, and the like; tri- and tetra-chloroethers and thioethers such as alpha, alpha', beta, beta'-tetrachloro diethyl ether and the like.

Still other polychloro ethers including those having two or more chlorine atoms on a single carbon atom such as alpha-alpha'-dichloro-diethyl ether may also be used. In short, any compound of the formula A—(Cl)$_n$ wherein A is a radical of any of the type set forth hereinabove may be used to produce the compounds of this invention.

The mercapto-acid used in the reaction of this invention may be any acid of the general formula HS—$R_1$—COOH, wherein $R_1$ is an alkylene radical. Included in this class are mercaptoacetic acid, alpha- and beta-mercaptopropionic acid, alpha-, beta- and gamma-mercapto butyric acid, omega-mercapto valeric acid, omega-mercapto caproic acid, omega-mercapto heptylic acid, omega-mercapto caprylic acid, omega-mercapto pelargonic acid, omega-mercapto capric acid, omega-mercapto undecyclic acid, omega-mercapto lauric acid, and the like.

The reaction of a mercapto-acid with one of the chlorine-containing compounds listed hereinabove to form the new compounds of this invention may be best carried out simply by adding the reactants in a water solution containing sufficient alkali metal hydroxide to neutralize all of the acid groups formed in the reaction. Best yields of the sulfur-containing polycarboxylic acids are obtained when the reaction is conducted at a temperature at or near the refluxing temperature of water. Accordingly, temperatures in the range of from 80° C. to 105° C. are preferred, but temperatures as low as 25° C. and as high as 150° C. may be used with good results.

The reaction takes place rapidly and is complete in most cases in approximately twenty or thirty minutes. After the reaction is complete, a strong mineral acid such as hydrochloric acid is added to precipitate the crude acid. The acid is then purified preferably by filtering and recrystallizing from an organic solvent to yield the pure sulfur-containing polycarboxylic acid.

New compounds which are prepared according to the reaction of this invention are listed below together with their preparation reaction equation. (The nomenclature used is that given in Chemical Abstracts, 39, page 5924, paragraph 297):

1. $2HOOC-CH_2-CH_2-SH + 4NaOH + ClCH_2-CH_2-O-CH_2-CH_2Cl$
   $\xrightarrow{HCl} HOOC-CH_2-CH_2-S-CH_2-CH_2-O-CH_2-CH_2-S-CH_2-CH_2-COOH$
   4,10-dithia-7-oxatridecandioic acid 2. $2HOOC-CH_2-CH_2-SH + 4NaOH + ClCH_2-CH_2-O-CH_2-CH_2-O-CH_2-CH_2Cl$
   $\xrightarrow{HCl} HOOC-CH_2-CH_2-S-CH_2-CH_2-O-CH_2-CH_2-O-CH_2-CH_2-S-CH_2-CH_2-COOH$
   4,13-dithia-7,10-dioxahexadecandioic acid 3. $2HOOC-CH_2-CH_2-SH + 4NaOH + ClCH_2-O-CH_2Cl$
   $\xrightarrow{HCl} HOOC-CH_2-CH_2-S-CH_2-O-CH_2-S-CH_2-CH_2-COOH$
   4,8-dithia-6-oxa-undecandioic acid 4. $2HOOC-CH_2-CH_2-SH + 2NaOH + CH_3-CH_2-O-CH-CH_2Cl$
   $\qquad\qquad\qquad\qquad\qquad\qquad\qquad\qquad\qquad\quad | $
   $\qquad\qquad\qquad\qquad\qquad\qquad\qquad\qquad\qquad\ Cl$ $\qquad\qquad\qquad\qquad\qquad\qquad\qquad\qquad O-C_2H_5$
   $\qquad\qquad\qquad\qquad\qquad\qquad\qquad\qquad\ \ |$
   $\xrightarrow{HCl} HOOC-CH_2-CH_2-S-CH-CH_2-S-CH_2-CH_2-COOH$
   4,7-dithia-5-ethoxy decandioic acid 5. $2HOOC-CH_2-CH_2-SH + 4NaOH + ClCH_2-CH_2-CH_2-O-CH_2-CH_2-CH_2Cl$
   $\xrightarrow{HCl} HOOC-CH_2-CH_2-S-CH_2-CH_2-CH_2-O-CH_2-CH_2-CH_2-S-CH_2-CH_2-COOH$
   4,12-dithia-8-oxapentadecandioic acid 6. $2HOOC-CH_2-SH + 4NaOH + ClCH_2-CH_2-O-CH_2-CH_2Cl$
   $\xrightarrow{HCl} HOOC-CH_2-S-CH_2-CH_2-O-CH_2-CH_2-S-CH_2-COOH$
   3,9-dithia-6-oxahexandecandioic acid 7. $2HOOC-CH_2-SH + 4NaOH + ClCH_2-O-CH_2Cl$
   $\xrightarrow{HCl} HOOC-CH_2-S-CH_2-O-CH_2-S-CH_2-COOH$
   3,7-dithia-5-oxanonanedioic acid 8. $2HOOC-CH_2-CH_2-SH + 4NaOH + ClCH_2-CH-O-CH-CH_2Cl$
   $\qquad\qquad\qquad\qquad\qquad\qquad\qquad\qquad\qquad | \quad\ \ |$
   $\qquad\qquad\qquad\qquad\qquad\qquad\qquad\qquad\ CH_3\ CH_3$ $\xrightarrow{HCl} HOOC-CH_2-CH_2-S-CH_2-CH-O-CH-CH_2-S-CH_2-CH_2-COOH$
   $\qquad\qquad\qquad\qquad\qquad\qquad\qquad\qquad\quad | \quad\quad\ |$
   $\qquad\qquad\qquad\qquad\qquad\qquad\qquad\ CH_3\quad CH_3$
   4,10-dithia-7-oxa-6,8-dimethyltridecandioic acid 9. $2HOOC-CH_2-SH + 4NaOH + ClCH_2-O-CH_2-CH_2Cl$
   $\xrightarrow{HCl} HOOC-CH_2-S-CH_2-O-CH_2-CH_2-S-CH_2-COOH$
   3,5-dithia-5-oxadecandioic acid 10. $2HOOC-CH_2-CH_2-CH_2-SH + 4NaOH + ClCH_2-CH_2-O-CH_2-CH_2Cl$
    $\xrightarrow{HCl} HOOC-(CH_2)_3-S-CH_2-CH_2-O-CH_2-CH_2-S-(CH_2)_3-COOH$
    5,11-dithia-8-oxapentadecandioic acid 11. $2HOOC-(CH_2)_{10}-SH + 4NaOH + ClCH_2-CH_2-O-CH_2-CH_2Cl$
    $\xrightarrow{HCl} HOOC-(CH_2)_{10}-S-CH_2-CH_2-O-CH_2-CH_2-S-(CH_2)_{10}-COOH$
    12,18-dithia-15-oxanonacosanedioic acid 12. $2HOOC-CH_2-SH + 4NaOH + ClCH_2-CH_2-CH_2-S-CH_2-CH_2-CH_2Cl$
    $\xrightarrow{HCl} HOOC-CH_2-S-CH_2-CH_2-CH_2-S-CH_2-CH_2-CH_2-S-CH_2-COOH$
    3,7,11-trithia-tridecandioic acid 13. $2HOOC-CH_2-CH_2-SH + 4NaOH + ClCH_2-CH_2-S-CH_2-CH_2Cl$
    $\xrightarrow{HCl} HOOC-CH_2-CH_2-S-CH_2-CH_2-S-CH_2-CH_2-S-CH_2-CH_2-COOH$
    4,7,10-trithia-tridecandioic acid 14. $2HOOC-CH_2-CH_2-SH + 4NaOH + ClCH_2-S-CH_2Cl$
    $\xrightarrow{HCl} HOOC-CH_2-CH_2-S-CH_2-S-CH_2-S-CH_2-CH_2-COOH$
    4,6,8-trithia-undecandioic acid The following examples describe the preparation of a number of the new compounds listed above. There are, of course, many forms of the invention other than these specific embodiments. All parts are given by weight.

*Example I*

To a solution of 160 parts (4 moles) of sodium hydroxide in 1500 parts of water maintained in a cooling bath were added slowly 212 parts (2 moles) of beta-mercapto propionic acid. The cooling bath was then removed and 143 parts (1 mole) of beta, beta'-dichloro-diethyl ether added. The mixture was then heated to a temperature of 104° C. for a period of thirty minutes. 200 parts of concentrated hydrochloric acid were then added and the precipitate which formed was filtered, dried and recrystallized from hot ethyl alcohol. 267 parts (94.7%) of substantially pure 4,10-dithia-7-oxatridecandioic acid (M. P. 126°–127° C.) were formed. Analysis: percent H: 6.57, 6.48; percent C: 42.69, 42.53; percent S: 22.76, 22.76; neut. equiv. 144; 141. Calc. for $C_{10}H_{18}O_5S_2$: percent H 6.43; percent C 42.55; percent S 22.70; neut. equiv. 141.1.

*Example II*

168 parts (4.2 moles) of sodium hydroxide were dissolved in 1000 parts of water maintained in a cooling bath. 223 parts (2.1 moles) of beta-mercapto propionic acid were added slowly to the mixture. After removing the cooling bath, 197 parts (1.05 moles) of triglycol dichloride were added and the mixture heated to a temperature of 103° C. for twenty minutes. 200 parts of concentrated hydrochloric acid were added and the precipitate which formed was filtered, dried and recrystallized from ethyl oxalate. 320 parts (96%) of 4,13-dithia-7,10-dioxahexadecandioic acid (M. P. 96°–97.5° C.) were formed.

*Example III*

145 parts (3.6 moles) of sodium hydroxide were dissolved in 1500 parts of water in a cooling bath. 190 parts (1.8 moles) of beta-mercaptopropionic acid were added slowly and with constant stirring. The cooling bath was removed and 99 parts (1.8 moles) of alpha-alpha'-dichloromethyl ether were then added and the mixture heated to 104° C. for a period of ten minutes with constant stirring. The mixture was then allowed to cool and 220 parts of concentrated hydrochloric acid were added. The precipitate which formed was dried and recrystallized from hot ethyl alcohol. 170 parts (77.8% yield) of pure 4,8-dithia-6-oxahendecandioic acid (M. P. 139°–141° C.) were formed.

*Example IV*

244 parts (6.1 moles) of sodium hydroxide were dissolved in 1500 parts of water maintained in a cooling bath. 323 parts (3.05 moles) of beta-mercaptopropionic acid were added with constant stirring. The cooling bath was removed and 256 parts (1.5 moles) of gamma, gamma'-dichloropropyl ether and 100 parts of ethyl alcohol were added to the mixture with constant stirring, and the mixture heated to a temperature of 89° C. for a period of one hour. 360 parts of concentrated hydrochloric acid were then added, and the precipitate filtered, dried, and recrystallized from ethyl acetate. 289 parts (60%) of pure 4,12-dithia-8-oxapentadecandioic acid (M. P. 83–84.5° C.) were formed.

*Example V*

328 parts (8.2 moles) of sodium hydroxide were dissolved in 1100 parts of water maintained in a cooling bath. 377 parts (4.1 moles) of alpha-mercaptoacetic acid were then added to the mixture. The cooling bath was removed and 246 parts (2 moles) of beta, beta'-dichlorodiethyl ether were added with constant stirring. The mixture was then heated for twenty minutes at a temperature of 102° C. 420 parts of concentrated hydrochloric acid were added. The reaction mixture was cooled to 20° C. and the product layer drawn off. After purification, there were obtained 495 parts of 3,9-dithia-6-oxahendecandioic acid.

The new acids of this invention are extremely useful organic compounds which may be used as intermediates in the production of esters, amides, and other derivatives. Their esters are very valuable as plasticizers and modifying agents for synthetic resins, cellulose derivatives and the like. The use of the esters of the new compounds as plasticizers for thermoplastic resins is disclosed in our copending application Serial No. 740,972 filed April 11, 1947, now Patent No. 2,530,882, and the esters themselves are disclosed more fully in our copending application Serial No. 755,478 filed June 18, 1947, now Patent No. 2,530,872.

These new acids may also be incorporated in fatty substances such as edible animal, vegetable, or fish oils, fats, and waxes to retard or inhibit the rancidity of the material, thus overcoming a very undesirable feature found in fatty foods, soap products, etc. which become rancid upon aging.

They may also be useful for still other purposes, for example, in the preparation of insecticidal and fungicidal compositions, and in the form of their water-soluble salts, in the preparation of compositions for use in the regulation of plant growth.

Although specific examples have been herein disclosed, it is not intended to limit the invention thereto, for there are numerous other embodiments which will be apparent to those skilled in the art and are included within the scope of the appended claims.

We claim:

1. The method which comprises reacting a compound of the formula $A(Cl)_n$ wherein A is a saturated aliphatic radical having from 2 to 4 connecting valences each on a carbon atom and containing only atoms of carbon, hydrogen and a chalcogen occurring in one of the short periods of the periodic table, there being present from 2 to 8 carbon atoms and from 1 to 2 chalcogen atoms each of which is present in the divalent state and is connected by each of its two valences to two different carbon atoms, and $n$ is a number equal to the valence of A, with a mercapto-substituted carboxylic acid of the formula

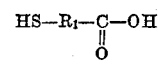

wherein $R_1$ is an alkylene radical containing from 1 to 12 carbon atoms, in an aqueous medium in the presence of an alkali metal hydroxide, acidifying the reaction mixture and recovering a sulfur-containing polycarboxylic acid of the formula

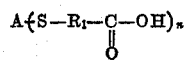

2. The method which comprises reacting a dichloro ether of the formula Cl—R—(O—R)$_n$—Cl wherein each R is an alkylene radical containing from 1 to 4 carbon atoms, and $n$ is an integer from 1 to 2, with a mercapto-substituted aliphatic carboxylic acid of the formula

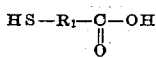

wherein $R_1$ is an alkylene radical containing from 1 to 12 carbon atoms, in an aqueous medium in the presence of an alkali metal hydroxide, acidifying the reaction medium with hydrochloric acid and recovering a sulfur-containing dicarboxylic acid of the formula

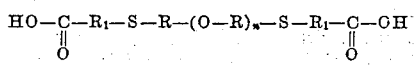

3. The method of claim 2 wherein the mercapto-substituted aliphatic carboxylic acid is beta-mercapto-propionic acid.

4. The method of claim 2 wherein the dichloro ether is beta, beta'-dichlorodiethyl ether.

5. The method of claim 2 wherein the dichloro ether is beta, beta'-dichlorodiethyl ether and the mercapto-substituted carboxylic acid is beta-mercapto-propionic acid, the compound recovered being 4,10-dithia-7-oxatridecanedioic acid.

6. The method of claim 2 wherein the dichloro ether is triglycol dichloride and the mercapto-substituted carboxylic acid is beta-mercapto-propionic acid, the compound recovered being 4,13-dithia-7,10-dioxahexadecanedioic acid.

7. The method of claim 2 wherein the dichloro ether is beta, beta'-dichlorodiethyl ether and the mercapto-substituted acid is mercapto acetic acid, the compound recovered being 3,9-dithia-6-oxahendecanedioic acid.

JAMES T. GREGORY.
JACOB E. JANSEN.

REFERENCES CITED

The following references are of record in the file of this patent:

UNITED STATES PATENTS

| Number | Name | Date |
|---|---|---|
| 2,393,327 | Langkammerer | Jan. 22, 1946 |

OTHER REFERENCES

Suter, Andreasch: Beilstein (Handbuch der Org. Chem., 4th ed.), vol. 6, p. 463 (1923).

Benary: Beilstein (Handbuch der Org. Chem., 4th ed.), vol. 3, sup., p. 95 (1929).

Ramberg et al.: Beilstein (Handbuch der Org. Chem., 4th ed.), vol. 3, sup., p. 96 (1929).

Rothstein, Chivers et al.: Beilstein (Handbuch der Org. Chem., 4th ed.), vol. 3, 2nd sup., p. 176 (1942).